(12) United States Patent
Yamazaki

(10) Patent No.: US 8,355,193 B2
(45) Date of Patent: Jan. 15, 2013

(54) ELECTROPHORETIC DISPLAY DEVICE AND ELECTRONIC APPARATUS

(75) Inventor: Katsunori Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 11 days.

(21) Appl. No.: 13/088,814

(22) Filed: Apr. 18, 2011

(65) Prior Publication Data

US 2011/0261432 A1    Oct. 27, 2011

(30) Foreign Application Priority Data

Apr. 22, 2010   (JP) .................................. 2010-098853

(51) Int. Cl.
 *G02F 1/03*   (2006.01)
(52) U.S. Cl. ........................................ 359/245; 359/296
(58) Field of Classification Search .................. 359/245, 359/296; 345/107
See application file for complete search history.

(56) References Cited

U.S. PATENT DOCUMENTS

| 7,782,292 B2 | 8/2010 | Miyasaka et al. |
| 2005/0253994 A1* | 11/2005 | Kamijima et al. ............ 349/155 |

FOREIGN PATENT DOCUMENTS

JP    A-2006-309131   11/2006

* cited by examiner

*Primary Examiner* — James Jones
(74) *Attorney, Agent, or Firm* — Oliff & Berridge, PLC

(57) ABSTRACT

An electrophoretic display device, which includes a first substrate, a second substrate, and an electrophoretic element disposed between the first substrate and second substrate, includes a plurality of pixel electrodes provided on the first substrate and arranged in a row direction and in a column direction, and a counter electrode provided on the second substrate. In conjunction with the pixel electrodes, the counter electrode applies a voltage to the electrophoretic element. The counter electrode includes an opening portion extending in at least one of the row direction and the column direction at a location opposite an area between the pixel electrodes that are adjacent to each other.

14 Claims, 14 Drawing Sheets

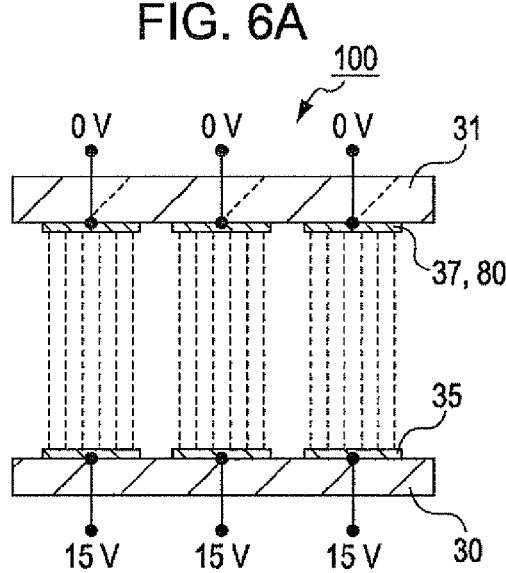
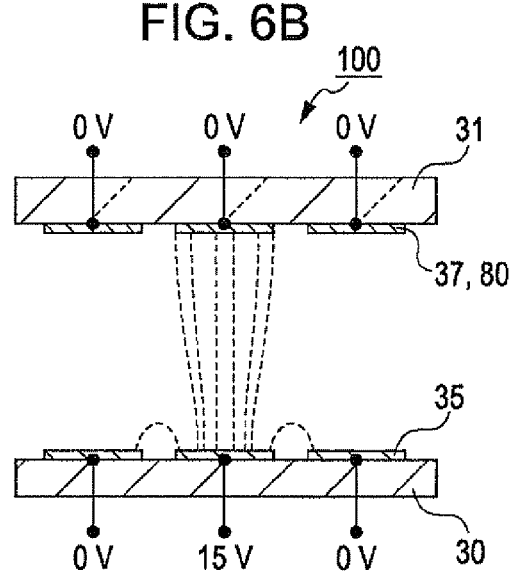
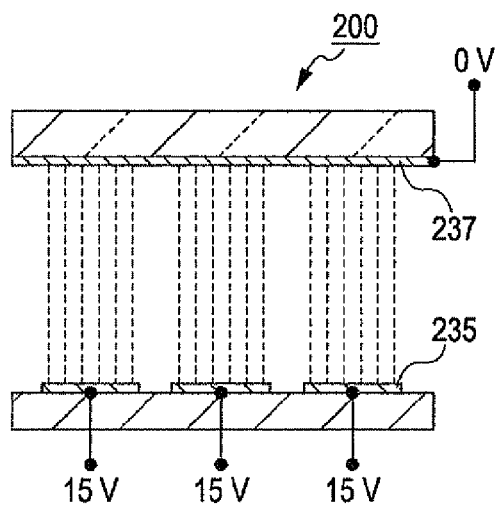
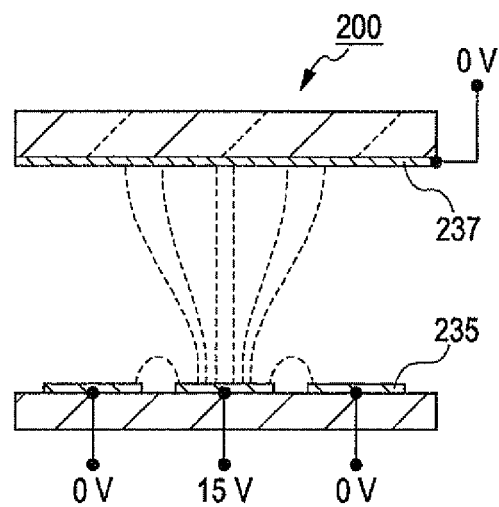

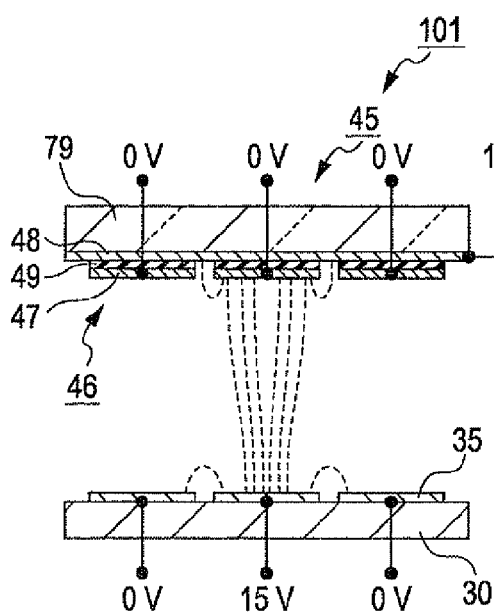
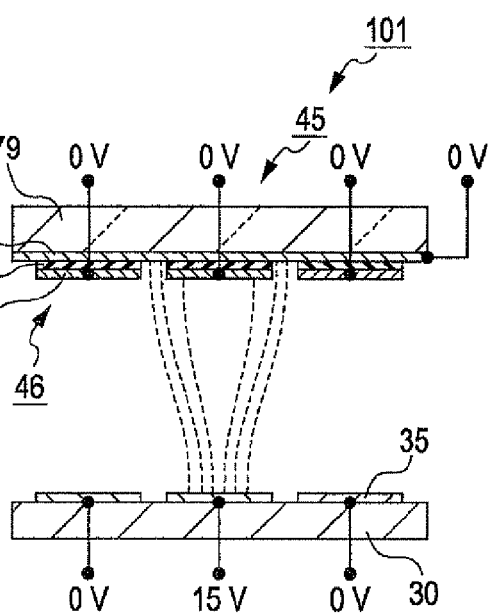

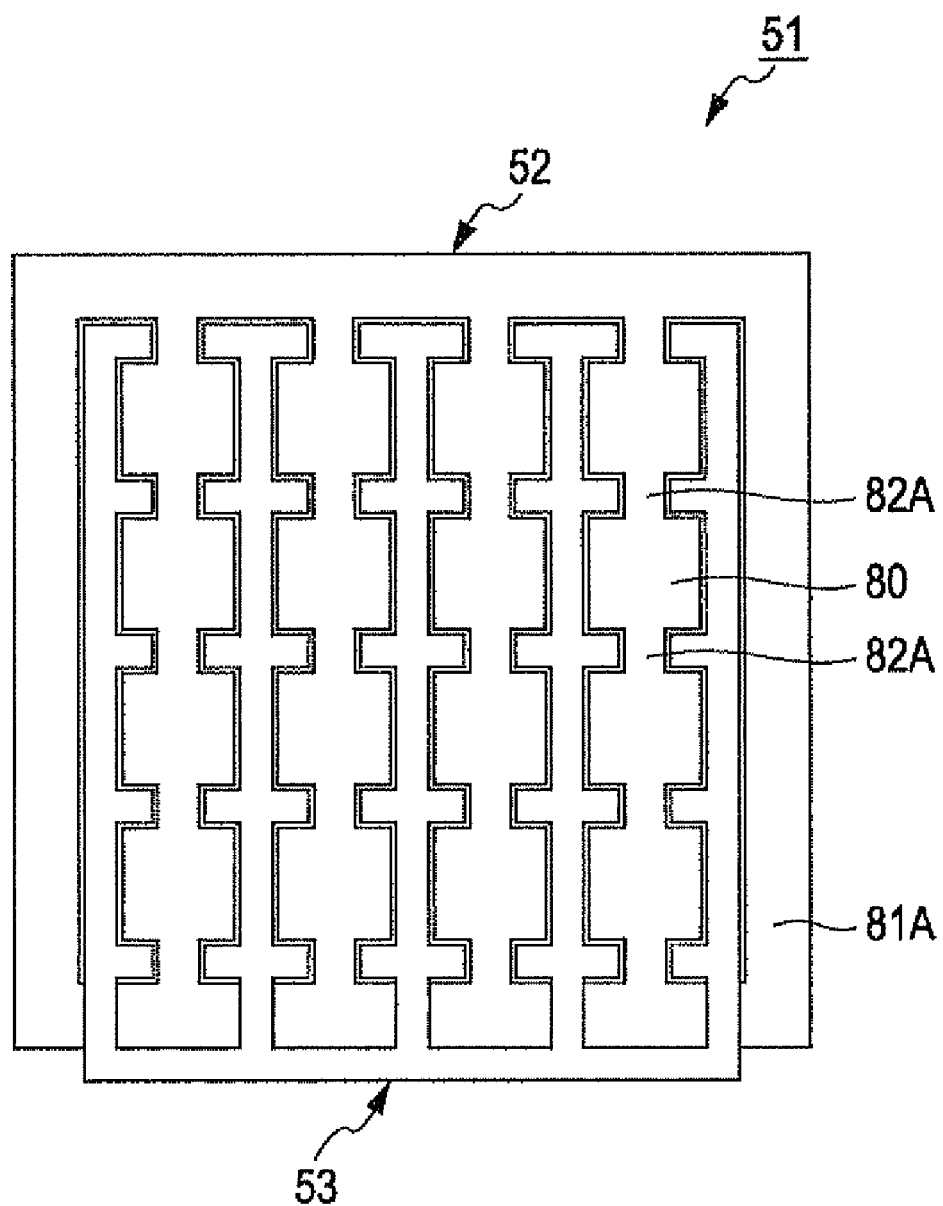

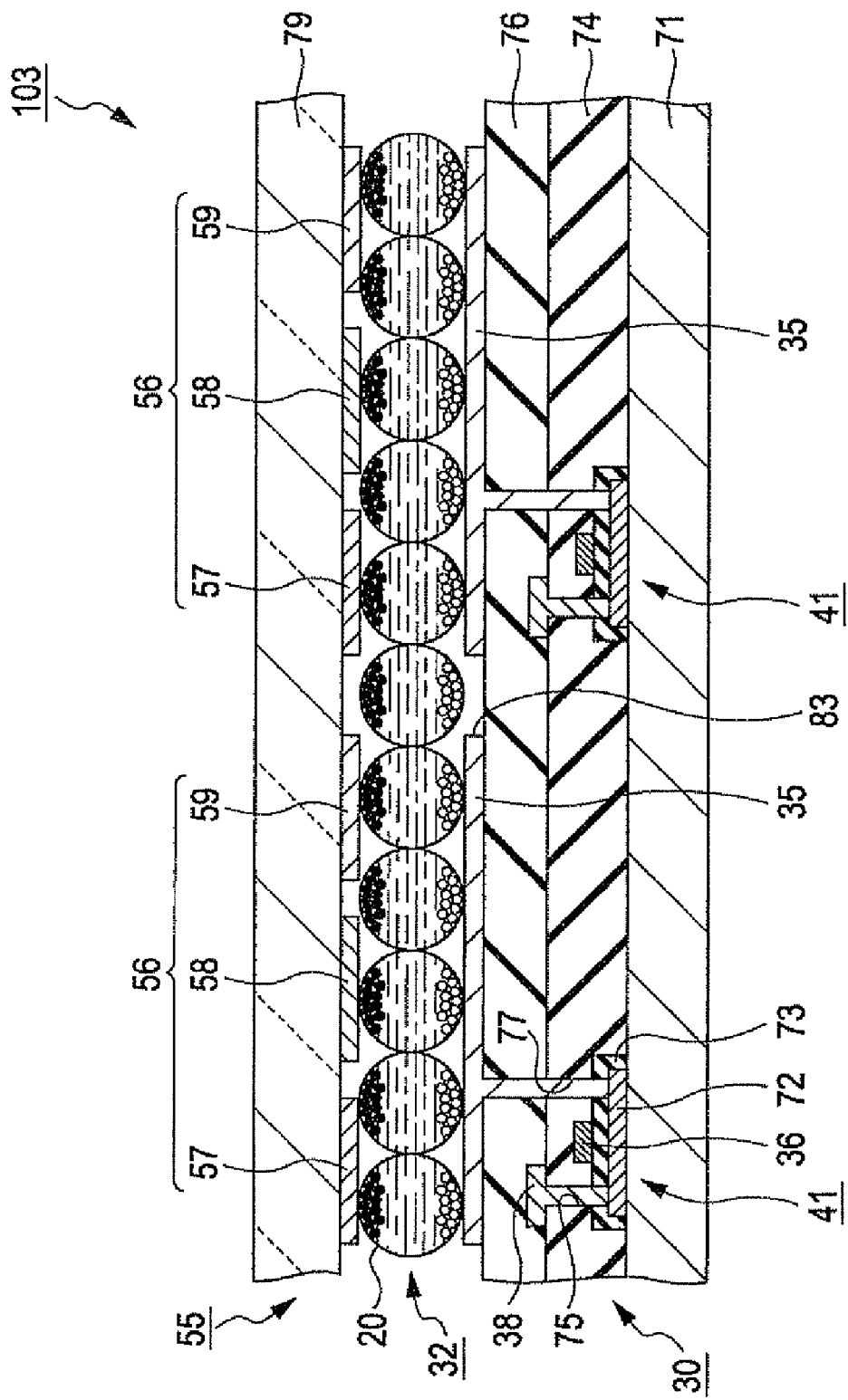

ELECTROPHORETIC DISPLAY DEVICE AND ELECTRONIC APPARATUS

CROSS-REFERENCE TO RELATED APPLICATION

This application is based on and claims priority from Japanese Patent Application No. 2010-098853, filed on Apr. 22, 2010, the contents of which are incorporated herein by reference.

BACKGROUND

1. Technical Field

The present invention relates to electrophoretic display devices and electronic apparatuses.

2. Related Art

There is known an electrophoretic display device having a configuration in which an electrophoretic element having a liquid phase dispersion medium and electrophoretic particles is disposed between a pair of substrates. In this type of electrophoretic display device, each of the pair of substrates is provided with an electrode. The electrophoretic display device controls the polarity, waveforms, amplitude, application time, frequency, and the like of a voltage to be applied between the electrodes so as to display a desired image. In what is called a matrix-type electrophoretic display device, a plurality of pixels forming an image are arranged in a matrix. Such an electrophoretic display device, as disclosed in JP-A-2006-309131, typically has an electrode configuration in which a plurality of pixel electrodes are formed in a matrix on one substrate, and a counter electrode is formed over the entire surface of the other substrate. In JP-A-2006-309131, it is also disclosed that one pixel is made up of n (n being an integer of two or more) subpixels, which enables gray-scale display by means of an area gray-scale.

One defect of the electrophoretic display device disclosed in JP-A-2006-309131 is that when a specific image is displayed, bleeding occurs around the image, and, particularly in the case of color display, color bleeding occurs, thereby degrading the display quality. Another defect is that when gray-scale display is performed, very many subpixels need be individually driven, which results in a complicated device configuration, an increased burden imposed on a driving circuit, and the like. It is conceivable, for example, that a color filter is provided to allow display of colors that differ from one subpixel to another, so that color display is realized. In this case, however, there exist similar defects to those in the aforementioned case.

SUMMARY

An advantage of some aspects of the invention is that it provides an electrophoretic display device that can be improved in display quality by a reduction of bleeding (color bleeding in the case of color display). Another advantage is that it provides an electrophoretic display device capable of performing gray-scale display and color display with a simple configuration. A further advantage is that it provides an electronic apparatus including an electrophoretic display device that is excellent in display quality.

An aspect of the invention provides an electrophoretic display device, which includes a first substrate, a second substrate, and an electrophoretic element disposed between the first substrate and the second substrate, includes a plurality of pixel electrodes provided on the first substrate and arranged in a row direction and in a column direction, and a counter electrode provided on the second substrate and configure to, in conjunction with the pixel electrodes, apply a voltage to the electrophoretic element. The counter electrode includes an opening portion extending in at least one of the row direction and the column direction at a location opposite an area between the pixel electrodes adjacent to each other.

The term "row direction" as used herein refers to a "horizontal direction" in a display screen of an electrophoretic display device, and the term "column direction" refers to a "vertical direction" of the electrophoretic display device.

For example, a case is assumed in which a first voltage is applied to one pixel electrode, and a second voltage (the second voltage is assumed to be different from the first voltage) is applied to a counter electrode and pixel electrodes adjacent to the one pixel electrode on both sides thereof. At this point, a pixel including the pixel electrode to which the first voltage has been applied is in a first display state (e.g., black display), and the adjacent pixels including the pixel electrodes to which the second voltage has been applied are in a second display state (e.g., white display).

Here, in the case of an existing electrophoretic display device, since a counter electrode is formed over the whole substrate, the voltage of one pixel electrode differs from the voltages of pixel electrodes adjacent to the one pixel electrode on both sides thereof under the voltage-applied states mentioned above. This causes lateral electric fields (electric fields in a direction parallel to the substrate surface) to be generated between the one pixel electrode and the pixel electrodes adjacent thereto. With the generation of lateral electric fields, a vertical electric field (an electric field in a direction perpendicular to the substrate surface) generated between one pixel electrode and the counter electrode expands, at a position closer to the counter electrode, toward the sides of pixels that are adjacent to a pixel of interest on both sides thereof. Therefore, the distribution of electrophoretic particles, which move along the electric field expanding toward the counter electrode, also expands toward the adjacent pixels. As a result, the pixel in the first display state (e.g., black display) appears to bleed, and thus an image with a blurred contour is visually recognized.

In contrast, in the case of the electrophoretic display device according to the aspect of the invention, the counter electrode is not formed over the entire surface of the substrate, but includes an opening portion extending in at least one of the row direction and the column direction at a location opposite an area between the pixel electrodes that are adjacent to each other. In other words, at the location opposite an area between the pixel electrodes that are adjacent to each other, an area where a counter electrode is not present in at least one of the row direction and the column direction is provided. Such an electrode configuration enables the expansion on the side of the counter electrode of the vertical electric field (the electric field in a direction perpendicular to the substrate surface) generated between one pixel electrode and the counter electrode to be decreased even in the above-mentioned voltage-applied sate. As a result, bleeding of display can be reduced, which allows display of a sharp image having a sharp contour.

The electrophoretic display device according to the aspect of the invention can employ a configuration in which the counter electrode includes a plurality of island-shaped portions provided at locations opposite respective ones of the plurality of pixel electrodes, a frame portion provided so as to surround a perimeter of the plurality of island-shaped portions, and coupling portions coupling the plurality of island-shaped portions to each other and coupling a predetermined one of the island-shaped portions and the frame portion.

With such a configuration, the island-shaped portions are provided at locations opposite the respective pixel electrodes, and therefore the expansion of the vertical electric field can be decreased both in the row direction and in the column direction around the pixel electrode. Accordingly, bleeding of display can be reduced in the horizontal direction and in the vertical direction of a screen. Also, the plurality of island-shaped portions are coupled to each other, and the island-shaped portion and the frame portion are coupled to each other, with the coupling portions. Therefore, for example, applying a voltage to the frame portion allows a common voltage to be applied collectively to the entire counter electrode.

The electrophoretic display device according to the aspect of the invention can employ a configuration in which the counter electrode includes a first counter electrode having the opening portion, and a second counter electrode provided at least in an area corresponding to the opening portion and being capable of applying a voltage independently of the first counter electrode.

With such a configuration, the combination of a voltage applied to the first counter electrode with a voltage applied to the second counter electrode is selected as appropriate, which makes it possible to implement an electrophoretic display device that can switch between a mode of displaying a sharp image under the action of the first counter electrode having the opening portion and a mode of displaying a soft focus image in which bleeding intentionally occurs under the actions of the first counter electrode and the second counter electrode.

This electrophoretic display device may have a configuration in which the second counter electrode is provided on the second substrate, and the first counter electrode is provided on the second counter electrode with an insulating layer interposed therebetween.

With such a configuration, the first counter electrode and the second counter electrode are opposite each other with an insulating layer interposed therebetween, and the first counter electrode and the second counter electrode are not short-circuited when overlapping each other in plan view. Therefore, the second counter electrode can be formed over the entire surface of the second substrate. In this case, an electrophoretic display device that can switch between the aforementioned display modes can be manufactured without patterning of the second counter electrode in manufacturing processes.

Alternatively, this electrophoretic display device may have a configuration in which the first counter electrode and the second counter electrode are formed in an identical layer.

With such a configuration, only patterning of one layer enables the first counter electrode and the second counter electrode to be formed, and therefore an electrophoretic display device that can switch between the aforementioned display modes can be manufactured without forming an insulating layer for isolation between the first counter electrode and the second counter electrode in manufacturing processes.

The electrophoretic display device according to the aspect of the invention can employ a configuration further including a color filter provided with color material layers of colors that differ in accordance with the plurality of pixel electrodes.

With such a configuration, an electrophoretic display device that allows color display with less color bleeding can be implemented.

Another aspect of the invention provides an electrophoretic display device, which includes a first substrate, a second substrate, and an electrophoretic element disposed between the first substrate and the second substrate, includes a plurality of pixel electrodes provided on the first substrate and arranged in a row direction and in a column direction, and a counter electrode provided on the second substrate and configured to, in conjunction with the pixel electrode, apply a voltage to the electrophoretic element. The counter electrode includes a plurality of electrodes each at a location opposite one of the pixel electrodes. The plurality of electrodes can individually apply a voltage.

With the electrophoretic display device according to another aspect of the invention, the combination of a voltage applied to the pixel electrode with a voltage applied to electrodes included in the counter electrode is selected as appropriate. This makes it possible to control the movements of electrophoretic particles in each of areas where the electrodes of the counter electrode are formed, in a region (pixel) corresponding to one pixel electrode. Therefore, without a configuration in which a pixel is made up of a plurality of sub-pixels, an electrophoretic display device that enables grayscale display with a simple configuration can be implemented.

The electrophoretic display device according to another aspect of the invention can have a configuration further including a color filter provided with color material layers of colors that differ in accordance with the plurality of pixel electrodes.

With such a configuration, the combination of a voltage applied to the pixel electrode with a voltage applied to electrodes included in the counter electrode is selected as appropriate. This makes it possible to implement an electrophoretic display device that enables color display with a simple configuration.

A further aspect of the invention provides an electronic apparatus including the electrophoretic display device according to one aspect of the invention.

According to the further aspect of the invention, it is possible to provide an electronic apparatus that includes the electrophoretic display device according to one aspect of the invention and therefore can display a sharp image and is excellent in display quality.

BRIEF DESCRIPTION OF THE DRAWINGS

The invention will be described with reference to the accompanying drawings, wherein like numbers reference like elements.

FIGS. 6A and 6B illustrate actions of the electrophoretic display device of the first embodiment.

FIGS. 7A and 7B illustrate defects of an existing electrophoretic display device.

FIGS. 10A and 10B illustrate actions of the electrophoretic display device of the second embodiment.

FIG. 11 is a plan view illustrating a counter electrode in an electrophoretic display device of a third embodiment of the invention.

FIG. 14 is a sectional view illustrating the electrophoretic display device of the fourth embodiment.

DESCRIPTION OF EXEMPLARY EMBODIMENTS

First Embodiment

With reference to FIGS. 1 through 8, a first embodiment of the invention will be described below. This embodiment is an example of an active matrix electrophoretic display device.

Figure 1:
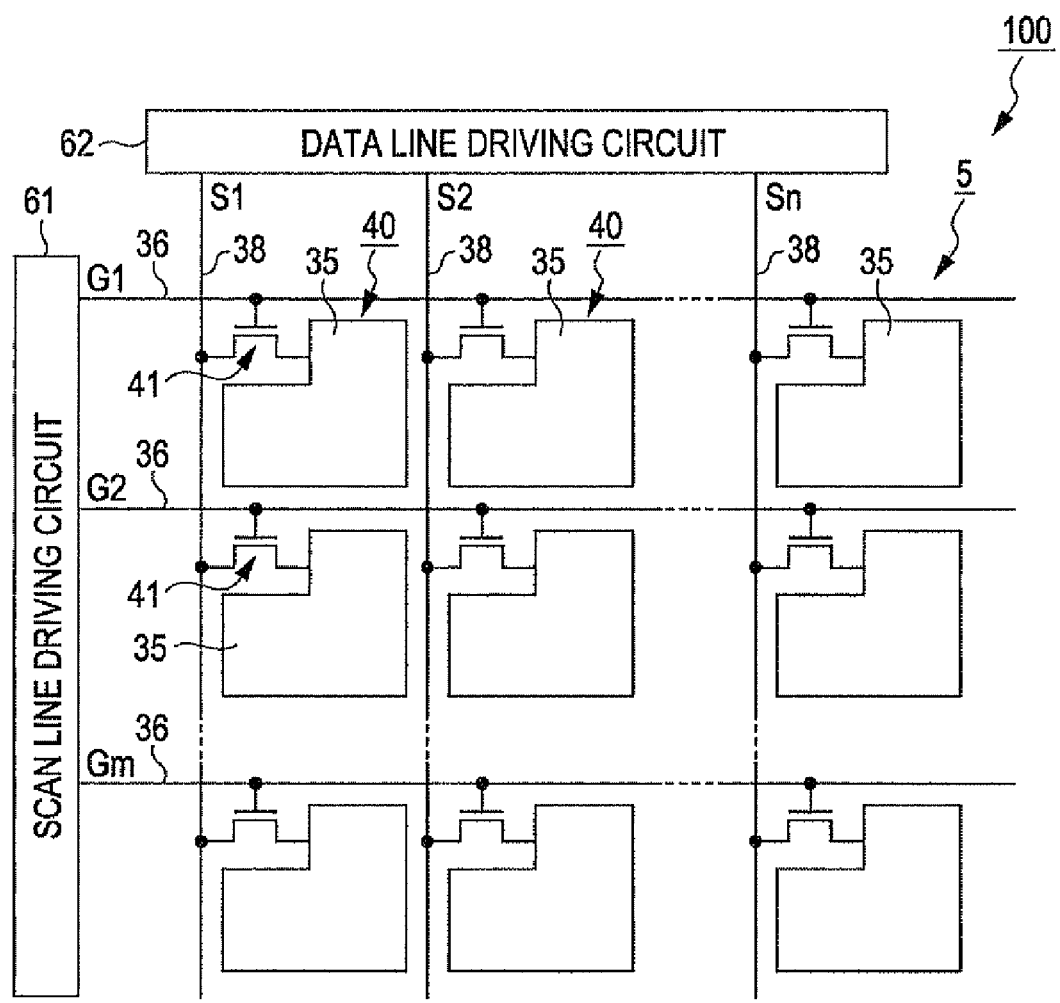
FIG. 1 is an equivalent circuit diagram illustrating an electrophoretic display device of a first embodiment of the invention.
Figure 2:
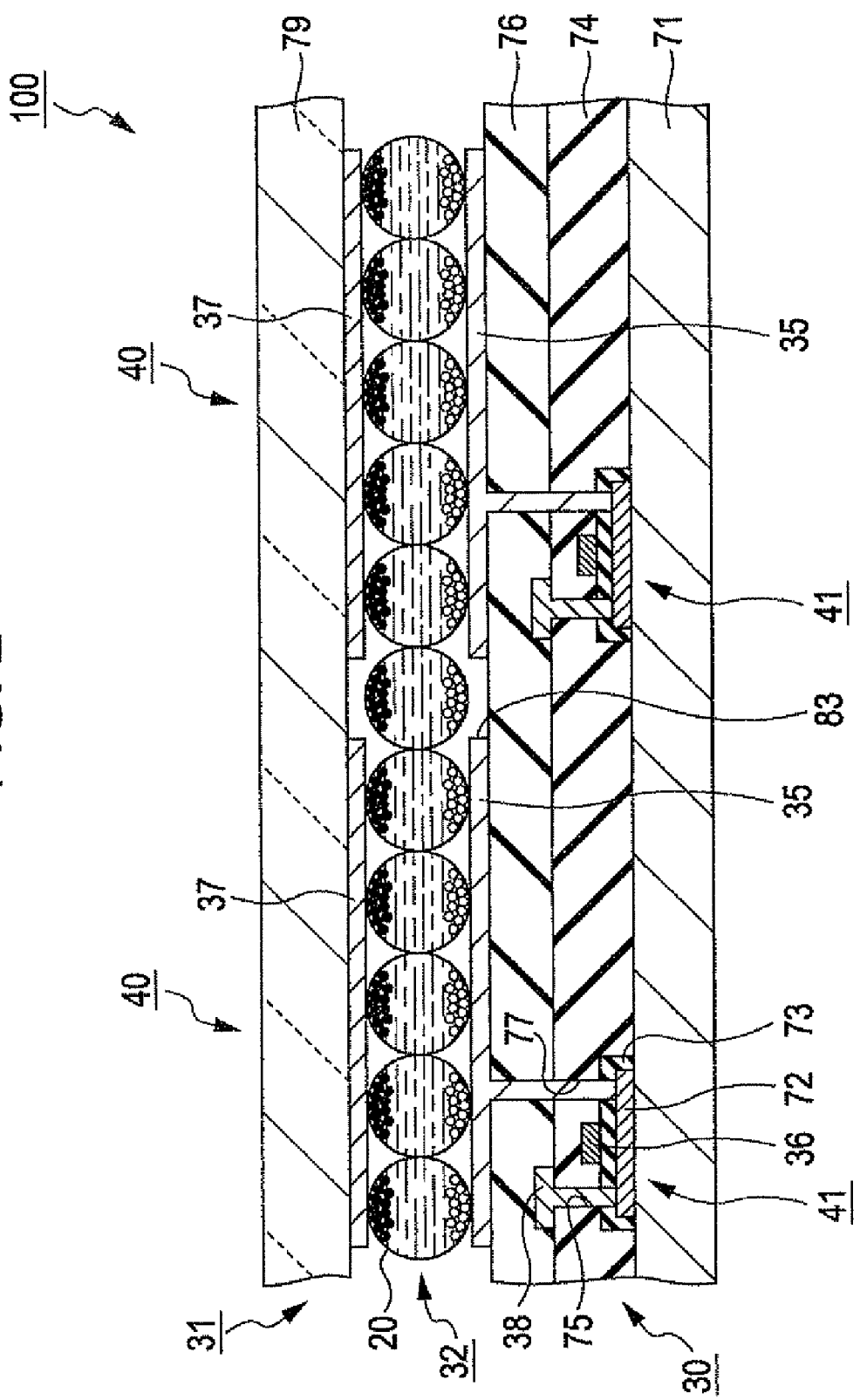
FIG. 2 is a sectional view illustrating an electrophoretic display device of the first embodiment.
Figure 3:
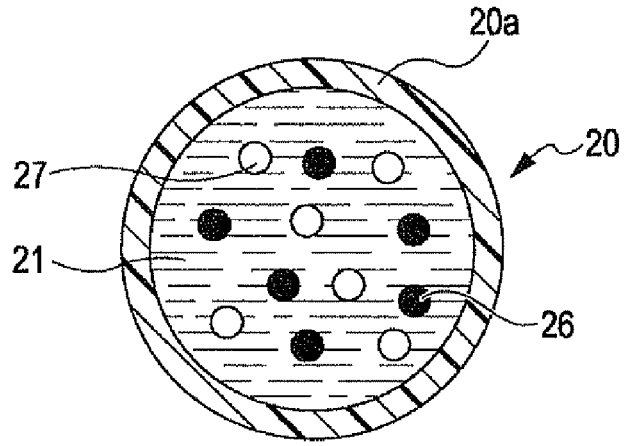
FIG. 3 is a sectional view illustrating a microcapsule included in an electrophoretic element.
Figure 4A:
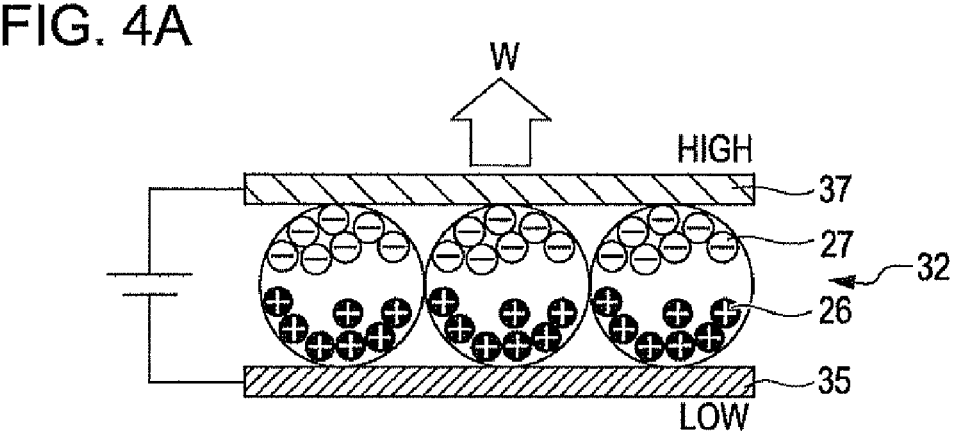
FIGS. 4A and 4B illustrate the operation of the electrophoretic element.
Figure 4B:
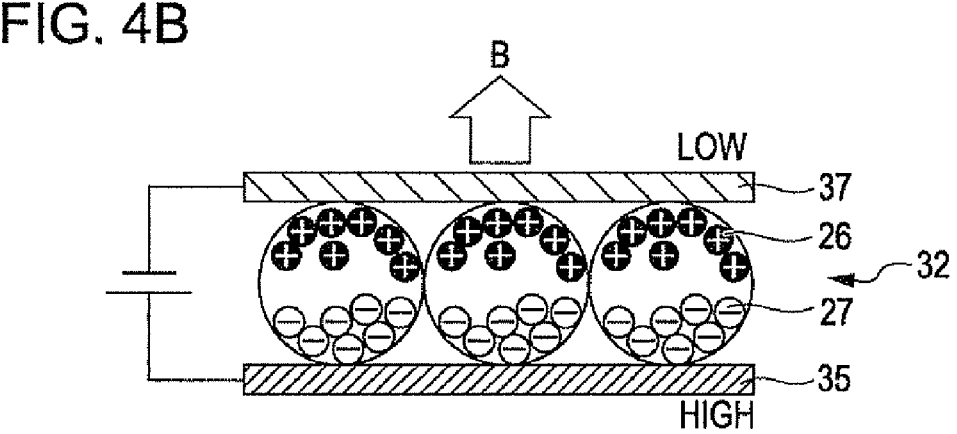
Figure 5:
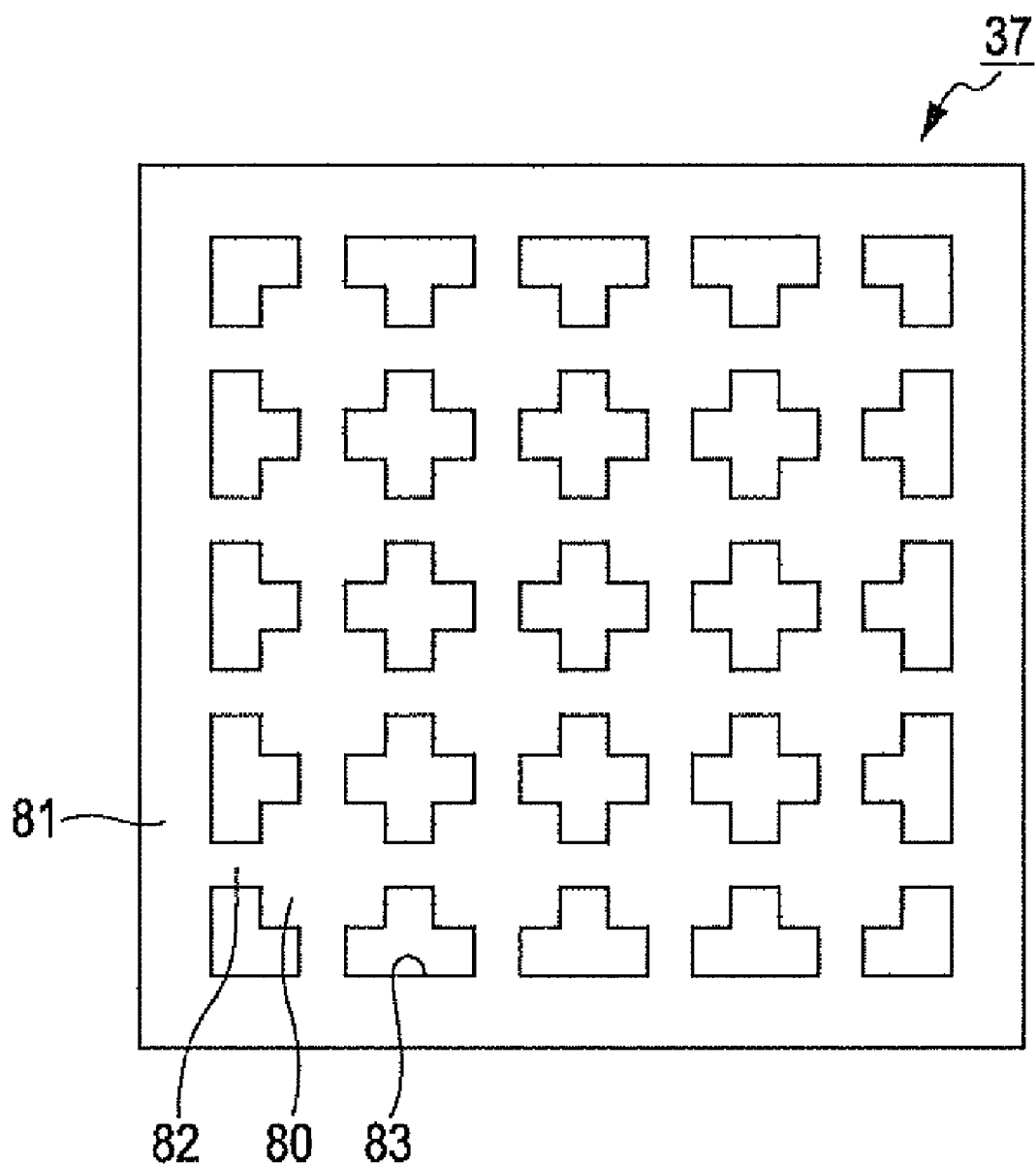
FIG. 5 is a plan view illustrating a counter electrode of the electrophoretic display device of the first embodiment.
Figure 8:
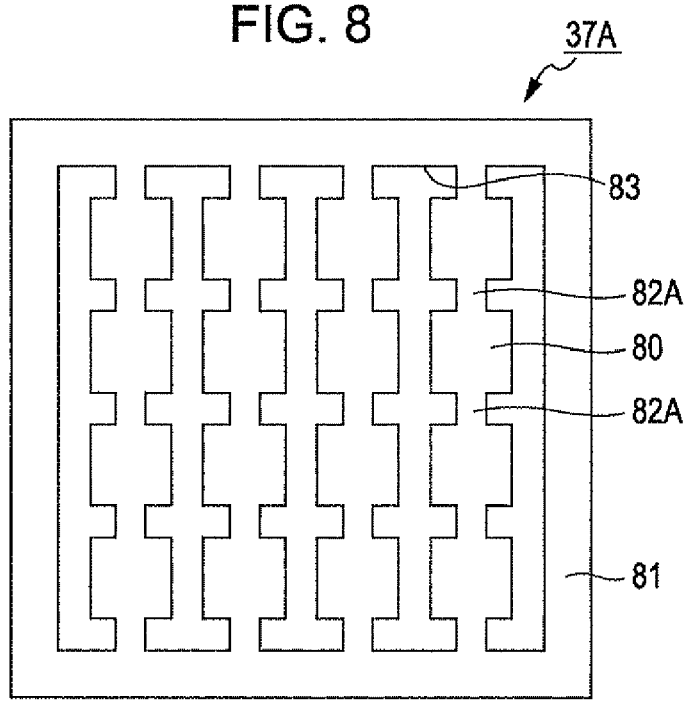
FIG. 8 is a plan view illustrating another example of the counter electrode.

FIG. 1 is an equivalent circuit diagram illustrating an electrophoretic display device of this embodiment. FIG. 2 is a sectional view of the electrophoretic display device. FIG. 3 is a sectional view of a microcapsule included in an electrophoretic element. FIGS. 4A and 4B illustrate the operation of the electrophoretic element. FIG. 5 is a plan view illustrating a counter electrode of an electrophoretic display device of this embodiment. FIGS. 6A and 6B illustrate actions of the electrophoretic display device of this embodiment. FIGS. 7A and 7B illustrate defects of an existing electrophoretic display device. FIG. 8 is a plan view illustrating another example of the counter electrode. It is to be noted that, for ease of visual understanding of components in the following drawings, some components are not drawn to scale.

An electrophoretic display device 100 of this embodiment, as illustrated in FIG. 1, includes a display section 5 in which a plurality of pixels 40 are arranged in a row direction and in a column direction in a matrix. A scan line driving circuit 61 and a data line driving circuit 62 are disposed at the periphery of the display section 5. The display section 5 is provided with a plurality of scan lines 36 extending from the scan line driving circuit 61 and a plurality of data lines 38 extending from the data line driving circuit 62, and the pixels 40 are provided so as to correspond to intersections of these lines. Each pixel 40 is provided with a select transistor 41 and a pixel electrode 35. It is to be noted that the "row direction" as used herein means a "horizontal direction" in the display section, and corresponds to the left and right direction of FIG. 1. The "column direction" means a "vertical direction" perpendicular to the horizontal direction, and corresponds to the up and down direction of FIG. 1.

The scan line driving circuit 61 is connected through m scan lines 36 (G1, G2, . . . , Gm) to the pixels 40. The scan line driving circuit 61 sequentially selects the 1st to mth scan lines 36 and, through the selected scan line 36, supplies selection signals defining the timings of turning on the select transistors 41 provided in the pixels 40. The data line driving circuit 62 is connected through n data lines 38 (S1, S2, . . . , Sn) to the pixels 40. The data line driving circuit 62 supplies to the pixels 40 image signals, each image signal specifying pixel data corresponding to a respective pixel 40.

The electrophoretic display device 100, as illustrated in FIG. 2, includes an element substrate 30 (a first substrate), a counter substrate 31 (a second substrate), and an electrophoretic element 32 including a plurality of microcapsules 20 aligned therein, the microcapsules being disposed between the element substrate 30 and the counter substrate 31. On the surface of the element substrate 30 on the side where the electrophoretic element 32 is disposed, the scan lines 36, the data lines 38, the select transistor 41, and the like illustrated in FIG. 1 are formed. It is to be noted that FIG. 2 illustrates a sectional structure of two adjacent pixels.

A substrate body 71 constituting the element substrate 30 is made of glass, plastic, or the like. The substrate body 71 is disposed on the side opposite the viewing side, and therefore need not be transparent. Semiconductor layers 72 are formed on a surface of the substrate body 71 on the side of the electrophoretic element 32, and a gate insulating film 73 is formed in such a manner as to cover each semiconductor layer 72. For the semiconductor layer 72, non-single-crystal-silicon materials such as amorphous silicon and polysilicon, oxide semiconductor materials, transparent oxide semiconductor materials such as In—Ga—Zn—O, and organic semiconductor materials such as a fluorine-bithiophene copolymer, for example, can be used. In the case of using an oxide semiconductor material for the semiconductor layer 72, it is preferable to use an oxide insulating material also for the gate insulating film 73. In the case of using an organic semiconductor material for the semiconductor layer 72, it is preferable to use an organic insulating material also for the gate insulating film 73.

On the gate insulating film 73, the scan line 36 functioning as the gate electrode of the select transistor 41 is formed. For the scan line 36, a laminated metallic film made up of an Al—Nd alloy and Mo, for example, can be used. In addition, an Al simple substance, ITO, Cu, Cr, Ta, Mo, Nb, Ag, Pt, Pd, In or Nd, or an alloy of the foregoing, or the like can be used. A first interlayer insulating film 74 is formed over the entire surface of the substrate body 71 in such a manner as to cover the scan lines 36. For the first interlayer insulating film 74, for example, an inorganic insulating material such as a silicon nitride film, a silicon oxide film, or a silicon oxynitride film, or an organic insulating material can be used. On the first interlayer insulating film 74, the data lines 38 are formed and are electrically connected through contact holes 75 to source regions of the semiconductor layers 72. Materials similar to those for the scan lines 36 can also be used for the data lines 38. It is to be noted that while, in FIG. 2, a top-gate structure is illustrated in which the gate electrode is formed above the semiconductor layer 72, a bottom-gate structure may be employed in which the gate electrode is formed below the semiconductor layer 72.

A second interlayer insulating film 76 is formed over the entire surface of the first interlayer insulating film 74 in such a manner as to cover the data lines 38. For the second interlayer insulating film 76, similarly to the first interlayer insulating film 74, for example, an inorganic insulating material such as a silicon nitride film, a silicon oxide film, or a silicon oxynitride film, or an organic insulating material can be used. On the second interlayer insulating film 76, the pixel electrodes 35 are formed and are electrically connected through contact holes 77 to the drain regions of the semiconductor layers 72. The pixel electrode 35 is formed of, for example, a transparent conductive material such as ITO (indium tin oxide), a metallic material such as Al, and the like, and is an electrode that, in conjunction with the counter electrode 37 to be described later, applies a voltage to the electrophoretic element 32. Although the planar shape of the pixel electrode 35 is not illustrated here, the pixel electrode 35 is formed to be substantially rectangular in accordance with an arrangement in which the data lines 38 and the scan lines 36 are nearly perpendicular to each other.

On the other hand, a substrate body 79 constituting the counter substrate 31 is a substrate made of glass, plastic, or the like, and is disposed on the viewing side, and therefore a transparent substrate is used for the substrate body 79. On a surface of the substrate body 79 on the side of the electrophoretic element 32, the counter electrode 37 is formed so as to face each pixel electrode 35. That is, the counter electrode 37 is formed in a divided manner for each pixel 40. The counter electrode 37 is an electrode that, together with the pixel electrode 35, applies a voltage to the electrophoretic element 32, and is formed of a transparent conductive material such as MgAg (magnesium-silver), ITO, or IZO (indium zinc oxide). The planar shape and the like of the counter electrode 37 are to be described later.

The electrophoretic element 32 and the pixel electrodes 35 are adhered to each other with an adhesive layer (not illustrated) therebetween, and, as a result, the element substrate 30 and the counter substrate 31 are bonded. The electrophoretic element 32 is formed in advance on the side of the counter substrate 31, and is typically handled as an electrophoretic sheet including the adhesive layer. In manufacturing processes, the electrophoretic sheet is handled under the condition where a protection release sheet is attached on the surface of the adhesive layer. The release sheet is removed from the electrophoretic sheet, and then the electrophoretic sheet is attached to the element substrate 30 on which the pixel electrodes 35, the select transistors 41, various circuits, and the like are formed separately. Thus, the display section 5 is formed. As such, the adhesive layer of the electrophoretic sheet exists only on the side of the pixel electrode 35.

As illustrated in FIG. 3, the microcapsule 20 has a particle diameter of about 50 μm, for example, and is a spherical body within which a dispersion medium 21, a large number of white particles (electrophoretic particles) 27, and a large number of black particles (electrophoretic particles) 26 are enclosed. The microcapsule 20, as illustrated in FIG. 2, is disposed between the counter electrode 37 and the pixel electrode 35, and a plurality of microcapsules 20 are arranged in the single pixel 40. It is to be noted that while FIG. 2 illustrates the configuration in which the plurality of microcapsules 20 are arranged in the single pixel 40, the configuration may be such that the single microcapsule 20 is arranged in the single pixel 40.

An outer shell portion 20a (a wall film) of the microcapsule 20 is formed using an acrylic resin such as polymethylmethacrylate or polyethylmethacrylate, a urea resin, or a polymeric resin with translucency such as gum arabic. The dispersion medium 21 is a liquid for dispersing the white particles 27 and the black particles 26 in the microcapsule 20.

Examples of the dispersion medium 21 can include water, alcohol solvents (such as methanol, ethanol, isopropanol, butanol, octanol, and methyl cellosolve), esters (such as ethyl acetate and butyl acetate), ketones (such as, acetone, methyl ethyl ketone, and methyl isobutyl ketone), aliphatic hydrocarbons (such as pentane, hexane, and octane), alicyclic hydrocarbons (such as cyclohexane and methylcyclohexane), aromatic hydrocarbons (benzene, toluene, and long-chain alkyl group-containing benzenes (e.g., xylene, hexylbenzene, heptylbenzene, octylbenzene, nonylbenzene, decylbenzene, undecylbenzene, dodecylbenzene, tridecylbenzene, and tetradecylbenzene)), halogenated hydrocarbons (such as methylene chloride, chloroform, carbon tetrachloride, and 1,2-dichloroethane) and carboxylate, and may include other oils. These substances can be used singly or as a mixture, and further may be combined with a surfactant and the like.

The white particles 27 are particles (polymer or colloid) of a white pigment such as titanium dioxide, zinc white, or antimony trioxide. The white particles 27 are charged, for example, negatively and are used. The black particles 26 are particles (polymer or colloid) of a black pigment such as aniline black or carbon black. The black particles 26 are charged, for example, positively and are used.

When needed, the white pigments and the black pigments may contain a charge control agent containing particles of an electrolyte, a surfactant, metal soap, a resin, rubber, oil, varnish, a compound, or the like; a dispersing agent such as a titanium coupling agent, an aluminum coupling agent, or a silane coupling agent; a lubricant; a stabilizer; or the like. Alternatively, instead of the black particles 26 and the white particles 27, pigments of, for example, red, green, blue, yellow, cyan, magenta, or the like may be used. Such a composition enables red, green, blue, yellow, cyan magenta, or the like to be displayed in the display section 5 without using a color filter. It is to be noted that, instead of the above-mentioned composition, a one-particle system in which charged particles of one kind are dispersed in the colored dispersion medium 21 may be used. Alternatively, charged particles of two or more kinds may be dispersed in the colored dispersion medium 21. Also, instead of the aforementioned configuration in which a dispersion medium and particles are enclosed within a microcapsule, a configuration in which an area between a pair of substrates is filled with a dispersion medium and particles may be used. In this case, with a partition provided between the pair of substrates, cells partitioned by the partition may be filled with the dispersion medium and the particles.

In the electrophoretic element 32 with the aforementioned configuration, in cases where the pixel 40 is displayed in white, as illustrated in FIG. 4A, the counter electrode 37 is kept at a relatively high potential, and the pixel electrode 35 is kept at a relatively low potential. In other words, when the potential of the counter electrode 37 is assumed as a reference potential, the pixel electrode 35 is kept negative. Thus, the white particles 27 that are negatively charged are pulled toward the counter electrode 37 whereas the black particles 26 that are positively charged are pulled toward the pixel electrode 35. As a result, a white color is visually recognized when this pixel is viewed from the side of the counter electrode 37.

On the other hand, in cases where the pixel 40 is displayed in black, as illustrated in FIG. 4B, the counter electrode 37 is kept at a relatively low potential, and the pixel electrode 35 is kept at a relatively high potential. In other words, when the potential of the counter electrode 37 is assumed as a reference potential, the pixel electrode 35 is kept positive. Thus, the black particles 26 that are positively charged are pulled toward the counter electrode 37 whereas the white particles 27 that are negatively charged are pulled toward the pixel electrode 35. As a result, a black color is visually recognized when this pixel is viewed from the side of the counter electrode 37.

Next, the configuration of the counter electrode 37, which characterizes the invention, will be described. The counter electrode 37, as illustrated in FIG. 5, includes a plurality of island-shaped portions 80, a frame portion 81, and a plurality of coupling portions 82, and these portions are formed of a single transparent conductive film. The island-shaped portions 80 are provided at locations opposite the respective pixel electrodes 35 on the element substrate 30. The island-shaped portion 80 herein is formed to be rectangular in accordance with the shape of the pixel electrode 35. However, the island-shaped portion 80 need not be rectangular, and can be formed in any shape, such as a circle or a polygon. The length of one side of the island-shaped portion 80 is set approximately equal to that of the pixel electrode 35. That is, in the case of this embodiment, the island-shaped portion 80 is formed to have approximately the same shape and approximately the same dimensions as the pixel electrode 35.

The frame portion 81 is provided so as to surround the perimeter of the plurality of island-shaped portions 80. That is, the frame portion 81 is provided so as to correspond to an area outside the display section 5. Further, the island-shaped portions 80 that are adjacent to each other are coupled with the coupling portion 82, and the outermost island-shaped portion 80 and the frame portion 81 are coupled with the coupling portion 82, so that these island-shaped portions 80 and the frame portion 81 are integrated, and also the frame portion 81 and the island-shaped portions 80 are electrically connected. Accordingly, applying a voltage to the frame portion 81 allows all the island-shaped portions 80 to be provided with the same common potential. In this embodiment, the island-shaped portions 80 in two directions are coupled with the coupling portions 82. That is, the island-shaped portions 80 that are adjacent to each other in the row direction and the island-shaped portions 80 that are adjacent to each other in the column direction are coupled with the coupling portions 82. The width (the size of the short side) of the coupling portion 82 is set to be sufficiently smaller than the size of one side of the island-shaped portion 80. With the configuration mentioned above, the counter electrode 37 has opening portions 83 extending in the row direction and in the column direction, and the opening portions 83 are at locations opposite areas between the pixel electrodes 35 that are adjacent to each other.

Here, with reference to FIGS. 6A and 6B and FIGS. 7A and 7B, defects of an existing electrophoretic display device and effects of the invention will be described. FIGS. 6A and 6B illustrate the states of electric fields in the electrophoretic display device 100 of this embodiment, and FIGS. 7A and 7B illustrate the states of electric fields in an existing electrophoretic display device 200. Each state is illustrated using electric force lines. These drawings each illustrate three pixels that are adjacent to one another. FIG. 6A and FIG. 7A illustrate the cases where three pixel electrodes all have a potential of +15 V, and counter electrodes or a counter electrode has a potential of 0 V. FIG. 6B and FIG. 7B illustrate the cases where a pixel electrode at the center (hereinafter referred to as the "central pixel electrode") has a potential of +15 V, pixel electrodes that are adjacent to the central pixel electrode on both sides thereof have a potential of 0 V, and counter electrodes or a counter electrode has a potential of 0 V. At this point, all the three pixels are displayed in black with the applied voltages illustrated in FIG. 6A and FIG. 7A, whereas the central pixel is displayed in black, and the pixels that are adjacent to the central pixel on both sides thereof are displayed in white with the applied voltages illustrated in FIG. 6B and FIG. 7B.

As illustrated in FIG. 7A, in the existing electrophoretic display device 200, in the case where three pixel electrodes 235 all have a potential of +15 V, and a counter electrode 237 has a potential of 0 V, an electric field is formed such that electric force lines extend in a nearly linear fashion between each pixel electrode 235 and the counter electrode 237. In contrast, as illustrated in FIG. 7B, in the case where the central pixel electrode 235 has a potential of +15 V, the pixel electrodes 235 that are adjacent to the central pixel electrode 235 on both sides thereof have a potential of 0 V, and the counter electrode 237 has a potential of 0 V, the counter electrode 237 is formed over the whole substrate in the existing electrophoretic display device 235, and therefore, with the generation of lateral electric fields (electric fields in a direction parallel to the substrate surface) between the adjacent pixel electrodes 235, a vertical electric field (an electric field in a direction perpendicular to the substrate surface) generated between the central pixel electrode 235 and the counter electrode 237 greatly expands, at a position closer to the counter electrode 237, toward the sides of pixels that are adjacent to the central pixel on both sides thereof. Therefore, the distribution of electrophoretic particles, which move along the electric field expanding toward the counter electrode 237, also expands toward the sides of the adjacent pixels. As a result, the central pixel that is displayed in black appears to bleed into the surroundings, and thus an image with a blurred contour is visually recognized.

In contrast, in the electrophoretic display device 100 of this embodiment, as illustrated in FIGS. 6A and 6B, the island-shaped portions 80 of the counter electrode 37 and the pixel electrodes 35 have approximately the same shape and approximately the same dimensions, and the island-shaped portions 80 and the pixel electrodes 35 are disposed to face each other. In this case, as illustrated in FIG. 6A, in the case where the three pixel electrodes 35 all have a potential of +15 V, and the counter electrode 37 has a potential of 0 V, an electric field is formed such that electric force lines extend in a nearly linear fashion between each pixel electrode 35 and the counter electrode 37. This situation is approximately the same as in the existing case illustrated in FIG. 7A.

However, as illustrated in FIG. 6B, in the case where the central pixel electrode 35 has a potential of +15 V, the pixel electrodes 35 adjacent to the central pixel electrode 35 on both sides thereof have a potential of 0 V, and the counter electrodes 37 have a potential of 0 V, an electric field is generated in a different manner from that in the existing case. Even with the generation of lateral electric fields between the pixel electrodes 35 that are adjacent to each other, the counter electrode 37 is absent in an area corresponding to an area between the adjacent pixel electrodes 35, and therefore the expansion of a vertical electric field (electric force lines) generated between the central pixel electrode 35 and the counter electrode 37 is smaller than that in the existing case, and the vertical electric field does not expand toward the sides of the adjacent pixel electrodes 35. As a result, bleeding of the central pixel displayed in black can be reduced, which allows display of a sharp image having a sharp contour.

It is to be noted that FIG. 5 illustrates the case of the counter electrode 37 in which the island-shaped portions 80 in two directions, that is, the adjacent island-shaped portions 80 in the row direction and the adjacent island-shaped portions 80 in the column direction, are coupled with the coupling portions 82. Instead of this configuration, for example, as illustrated in FIG. 8, a counter electrode 37A may be employed. The counter electrode 37A has a configuration where the island-shaped portions 80 that are adjacent to each other in the column direction are coupled with coupling portions 82A, and the island-shaped portions 80 that are adjacent to each other in the row direction are not coupled. In this case, bleeding reduction effects nearly the same as those in the case of the configuration of FIG. 5 can be obtained. Further, due to the absence of a coupling portion coupling the island-shaped portions 80 that are adjacent in the row direction, bleeding in the row direction (the left and right direction) can be further reduced particularly around the center of a pixel.

In addition, in the configuration of FIG. 5 or FIG. 8, the island-shaped portions 80 and the coupling portions 82 or 82A are provided to form the opening portions 83 (portions where the counter electrode is absent) of the counter electrode 37 or 37A extending in the column direction and in the row direction. Instead of this configuration, the counter electrode may have a configuration where, in the counter electrode, opening portions (slits) extending in a linear fashion and having a fixed width are formed, so that portions where the electrode is present are formed in the shape of bands having a fixed width. For example, if opening portions extending in the column direction are formed, bleeding in the row direction can be reduced. If opening portions extending in the row direction are formed, bleeding in the column direction can be reduced. In either case, however, bleeding in the other direction cannot be reduced. Nonetheless, in cases where bleeding in one direction is permitted depending on the content and application of an image to be displayed, the electrode configuration mentioned above may be employed.

Second Embodiment

Figure 9:
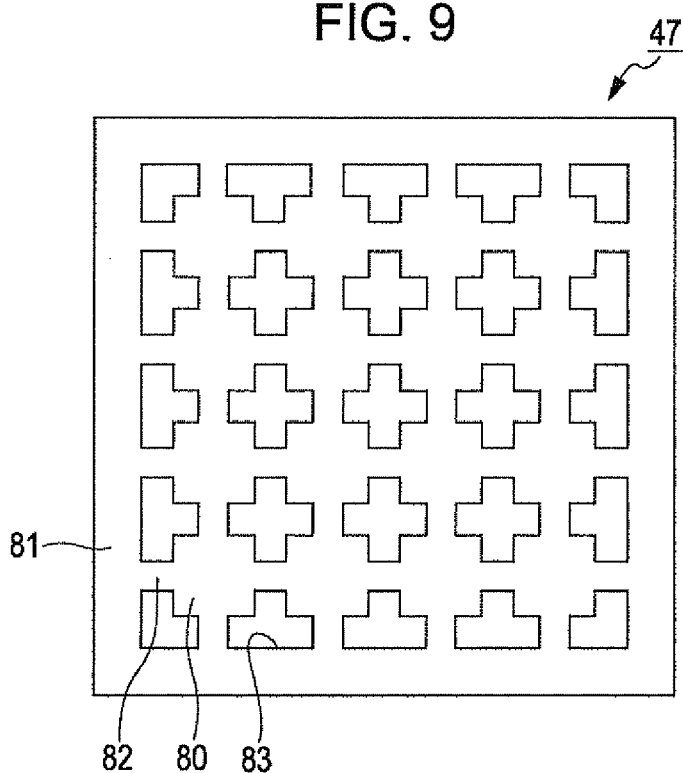
FIG. 9 is a plan view illustrating a counter electrode in an electrophoretic display device of a second embodiment of the invention.

With reference to FIG. 9 and FIGS. 10A and 10B, a second embodiment of the invention will be described below. The basic configuration of an electrophoretic display device of this embodiment is similar to that of the first embodiment. However, the configuration of a counter electrode differs from that of the first embodiment. FIG. 9 is a plan view of a first counter electrode in the electrophoretic display device of this embodiment. FIGS. 10A and 10B are sectional views of the electrophoretic display device of this embodiment, and illustrate only the electrode configurations. In FIG. 9 and FIGS. 10A and 10B, components in common with the figures referred to in the first embodiment are denoted by the same reference characters, and the detailed description thereof is omitted.

In an electrophoretic display device 101 of this embodiment, the configuration of the side of the element substrate 30 is exactly the same as that of the first embodiment. The configuration of the side of a counter substrate 45, as illustrated in FIGS. 10A and 10B, is that a counter electrode 46 is made up of electrodes in two layers, that is, a first counter electrode 47 and a second counter electrode 48. Specifically, the second counter electrode 48 is formed on a surface of the substrate body 79 on the side of the electrophoretic element 32, and the first counter electrode 47 is formed on the second counter electrode 48 with an insulating film 49 interposed therebetween. The second counter electrode 48 is formed on the entire surface of the substrate body 79 whereas the first counter electrode 47 is formed so as to face the pixel electrodes 35. That is, the first counter electrode 47 and the second counter electrode 48 are electrically isolated from each other by the insulating film 49, which results in a configuration that allows voltages to be applied individually to the first counter electrode 47 and the second counter electrode 48.

In other words, the first counter electrode 47, as illustrated in FIG. 9, includes the plurality of island-shaped portions 80, the frame portion 81 and the plurality of coupling portions 82, and has a configuration similar to that of the counter electrode 37 of the first embodiment. The first counter electrode 47 and the second counter electrode 48 are electrodes that, together with the pixel electrode 35, apply a voltage to the electrophoretic element 32. The first counter electrode 47 and the second counter electrode 48 are formed of a transparent conductive material, such as MgAg, ITO, or IZO. Also, an inorganic insulating material such as a silicon nitride film, or an organic insulating material can be used for the insulating film 49, and a material similar to those of the first and second interlayer insulating films 74 and 76 of the element substrate 30 can be employed. It is to be noted that FIGS. 10A and 10B illustrate examples where the insulating film 49 is formed directly underneath the first counter electrode 47 only. However, instead of this configuration, an insulating film may be formed over the entire surface of the second counter electrode 48.

In the electrophoretic display device 101 of this embodiment, inclusion of the first counter electrode 47 having opening portions enables bleeding reduction effects to be obtained by actions similar to those of the first embodiment. Furthermore, in the case of this embodiment, it is possible to implement an electrophoretic display device that not only achieves bleeding reduction but also can switch between a mode of displaying a sharp image with reduced bleeding and a mode of displaying a soft focus image with intentionally produced bleeding based on a combination of voltages to be applied to the first counter electrode 47 and the second counter electrode 48.

For example, as illustrated in FIG. 10A, in the case where the central pixel electrode 35 has a potential of +15 V, the pixel electrodes 35 adjacent to the central pixel electrode 35 on both sides thereof have a potential of 0 V, the first counter electrode 47 has a potential of 0 V, and the second counter electrode 48 has a potential of 15 V, lateral electric fields (diagonal electric fields) are generated between the island-shaped portions 80 and the second counter electrode 48 at the edges of the island-shaped portions 80 included in the first counter electrode 47 on the counter electrode side, and therefore the expansion of a vertical electric field generated between the central pixel electrode 35 and the counter electrode 46 further decreases compared to the first embodiment. As a result, bleeding can be reduced, which allows display of a sharp image having a sharp contour.

On the other hand, as illustrated in FIG. 10B, in the case where the central pixel electrode 35 has a potential of +15 V, the pixel electrodes 35 adjacent to the central pixel electrode 35 on both sides thereof have a potential of 0 V, the first counter electrode 47 has a potential of 0 V, and the second counter electrode 48 has a potential of 0 V, the first counter electrode 47 and the second counter electrode 48 have the same potential. Therefore, the first counter electrode 47 and the second counter electrode 48 are equivalent to an existing counter electrode that is solidly formed over the entire surface, and a vertical electric field generated between the central pixel electrode 35 and the counter electrode 46 expands. As a result, display bleeding occurs, thereby allowing display of a soft focus image. Accordingly, in the case mentioned above, with the potential of the first counter electrode 47 set to 0 V, the potential of the second counter electrode 48 is set to 0 V or set to +15 V, which enables switching between the aforementioned two display modes.

In the case of this embodiment, although a process of forming the insulating film 49 is required in manufacturing processes, an electrophoretic display device that enables switching between the aforementioned display modes can be manufactured without patterning of the second counter electrode 48.

Third Embodiment

Figure 12A:
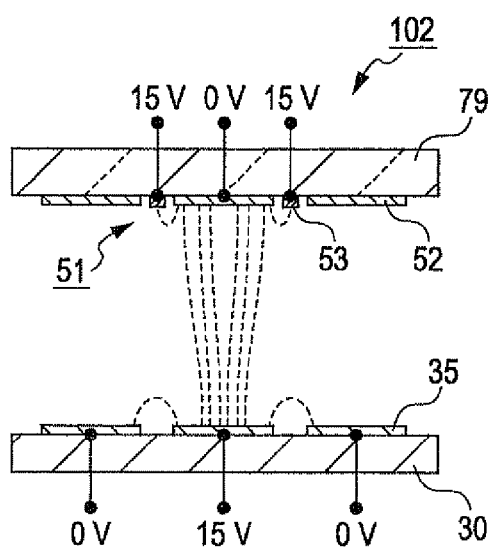
FIGS. 12A and 12B illustrate actions of the electrophoretic display device of the third embodiment.
Figure 12B:
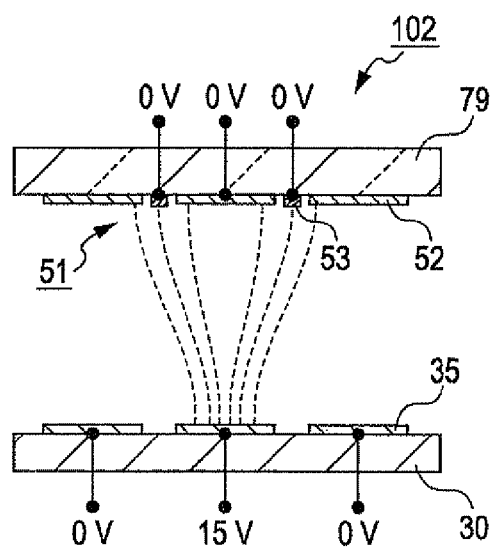

With reference to FIG. 11 and FIGS. 12A and 12B, a third embodiment of the invention will be described below. The basic configuration of an electrophoretic display device of this embodiment is similar to that of the first embodiment, and inclusion of a switching function between a sharp image display mode and a soft focus image display mode is similar to that of the second embodiment. However, the configuration of counter electrodes differs from that of the second embodiment. FIG. 11 is a plan view of first and second counter electrodes in the electrophoretic display device of this embodiment. FIGS. 12A and 12B are sectional views of the electrophoretic display device of this embodiment, and illustrate only electrode configurations. In FIG. 11 and FIGS. 12A and 12B, components in common with the figures referred to in the first embodiment are denoted by the same reference characters, and the detailed description thereof is omitted.

In the second embodiment, the first counter electrode 47 is formed on the second counter electrode 48 with the insulating film 49 interposed therebetween. In contrast, in an electrophoretic display device 102 of this embodiment, as illustrated in FIGS. 12A and 12B, a counter electrode 51 is made up of two electrodes, a first counter electrode 52 and a second counter electrode 53, and the first counter electrode 52 and the second counter electrode 53 are disposed together on a surface of the substrate body 79. The first counter electrode 52 and the second counter electrode 53 are shaped to engage with each other in a comb-like fashion. That is, a transparent conductive film is formed on the substrate body 79, and then the transparent conductive film is patterned, so that the first counter electrode 52 and the second counter electrode 53 can be formed.

As illustrated in FIG. 11, the first counter electrode 52 includes the plurality of island-shaped portions 80, a frame portion 81A, and the plurality of coupling portions 82, like in the second embodiment. However, the frame portion 81A does not surround the whole perimeter of the plurality of island-shaped portions 80. The frame portion 81A is formed so as to surround three sides (the top side, the left side, and the right side of FIG. 11) out of four sides of the display section 5, whereas the frame portion 81A is not formed on the remaining one side (the bottom side of FIG. 11). Further, the second counter electrode 53 is provided in portions corresponding to opening portions of the first counter electrode 52, that is, portions corresponding to areas between the pixel electrodes 35 that are adjacent to each other. The first counter electrode 52 and the second counter electrode 53 are disposed apart from each other with minute spacing therebetween, and thus the first counter electrode 52 and the second counter electrode 53 are electrically isolated from each other. Thus, the first counter electrode 52 and the second counter electrode 53 are configured to individually apply a voltage.

The voltage application pattern at the time of switching between the sharp image display mode and the soft focus image display mode is similar to that of the second embodiment. That is, on the one hand, as illustrated in FIG. 12A, in the case where the central pixel electrode 35 has a potential of +15 V, the pixel electrodes 35 adjacent to the central pixel electrode 35 on both sides thereof have a potential of 0 V, the first counter electrode 52 has a potential of 0 V, and the second counter electrode 53 has a potential of 15 V, the expansion of a vertical electric field is small, and therefore bleeding can be reduced, which allows display of a sharp image. On the other hand, as illustrated in FIG. 12B, in the case where the central pixel electrode 35 has a potential of +15 V, the pixel electrodes 35 adjacent to the central pixel electrode 35 on both sides thereof have a potential of 0 V, the first counter electrode 52 has a potential of 0 V, and the second counter electrode 53 has a potential of 0 V, a vertical electric field expands and therefore display bleeding occurs, which allows display of a soft focus image.

In the case of this embodiment, the insulating film forming process used in the second embodiment is not required, and an electrophoretic display device that can switch between two display modes can be manufactured using simple manufacturing processes.

It is to be noted that while, in the foregoing first to third embodiments, a description has been given of the configuration in which monochrome display is performed using the white particles 27 and the black particles 26, a configuration of providing a color filter between the substrate body 79 on the counter substrate side and the counter electrode 51 or between the counter electrode 51 and the electrophoretic element 32 may be employed. Such a configuration enables implementation of an electrophoretic display device that enables color display with less color bleeding.

Fourth Embodiment

Figure 13:
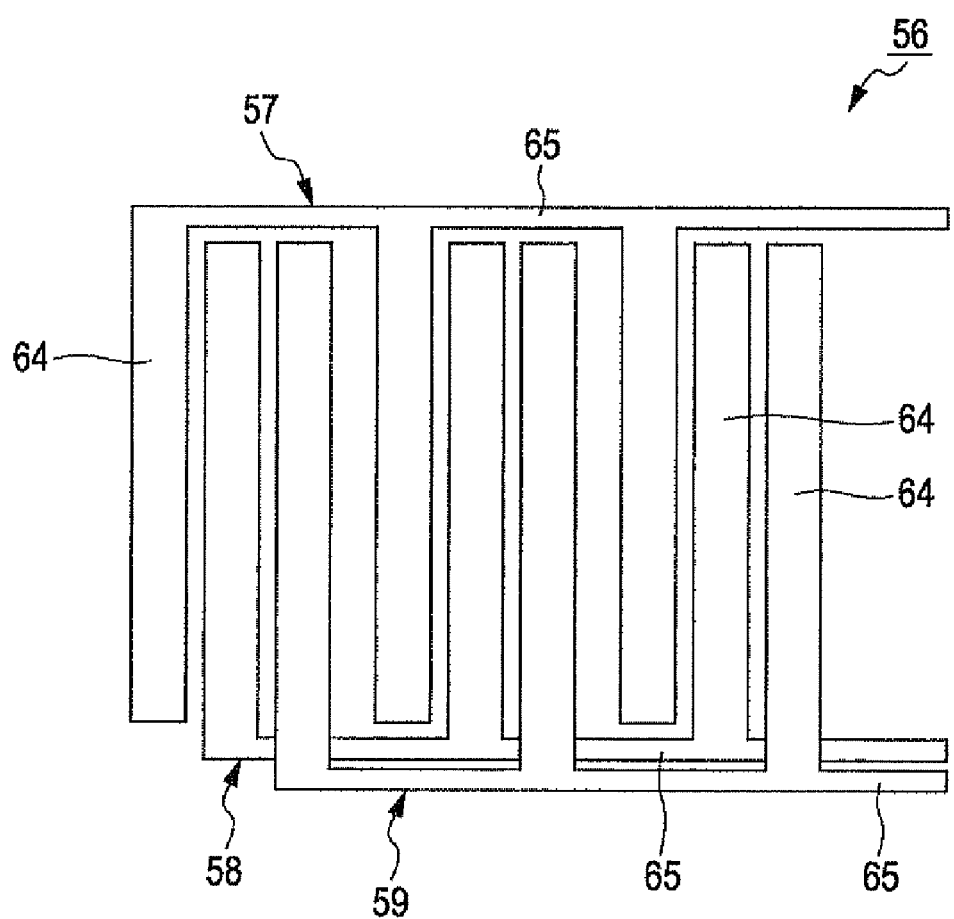
FIG. 13 is a plan view illustrating a counter electrode in an electrophoretic display device of a fourth embodiment of the invention.

With reference to FIGS. 13, 14, and 15A through 15D, a fourth embodiment of the invention will be described below. The basic configuration of an electrophoretic display device of this embodiment is similar to that of the first embodiment. However, the configuration of a counter electrode differs from that of the first embodiment. FIG. 13 is a plan view of a counter electrode in the electrophoretic display device of this embodiment. FIG. 14 is a sectional view of the electrophoretic display device of this embodiment, and FIGS. 15A through 15D illustrate the operation of the electrophoretic display device of this embodiment. In FIGS. 13, 14, and 15A through 15D, components in common with the figures referred to in the first embodiment are denoted by the same reference characters, and the detailed description thereof is omitted.

In an electrophoretic display device 103 of this embodiment, the configuration of the side of the element substrate 30 is exactly the same as that of the first embodiment. The configuration of the side of a counter substrate 55, as illustrated in FIG. 13 and FIG. 14, is that a counter electrode 56 is made up of three electrodes, that is, a first counter electrode 57, a second counter electrode 58, and a third counter electrode 59. The first counter electrode 57, the second counter electrode 58, and the third counter electrode 59 are formed such that the three counter electrodes 57, 58, and 59 are nearly contained within an area opposite one pixel electrode 35. The first counter electrode 57, the second counter electrode 58, and the third counter electrode 59 are configured to be able to individually apply a voltage.

Each of the first counter electrode 57, the second counter electrode 58, and the third counter electrode 59, as illustrated in FIG. 13, includes an electrode portion 64 provided at a position opposite part of the pixel electrode 35, and a coupling portion 65. The coupling portions couple the first counter electrodes 57 to each other, the second counter electrodes 58 to each other, and the third counter electrodes 59 to each other, respectively, over the pixels 40 that are adjacent in the row direction (the left and right direction of FIG. 13). The areas of the electrode portions 64 of the counter electrodes 57, 58, and 59 are nearly equal, and each of the areas accounts for approximately one third of the area of the pixel 40. However, the areas of the electrode portions 64 of the counter electrodes 57, 58, and 59 need not be equal, and may be intentionally different. If a configuration in which the areas of electrode portions differ from one electrode to another is employed, gray-scale display to be described later can be realized.

The coupling portion 65 of the first counter electrode 57 is arranged on one end side (the upper side of FIG. 13) of the pixel 40, and the coupling portion 65 of the second counter electrode 58 and the coupling portion 65 of the third counter electrode 59 are arranged on the other end side (the lower side of FIG. 13) of the pixel 40. As a result of this arrangement, the second counter electrode 58 and the third counter electrode 59 have portions at which the second counter electrode 58 and the third counter electrode 59 intersect with each other in plan view. For these intersection portions, there is employed, for example, a three-dimensional intersection in which one counter electrode intersects with the other counter electrode with an insulating film interposed therebetween, so that the intersection portion of one counter electrode is lower or upper than the intersection portion of the other counter electrode. This results in electrical isolation of the second counter electrode 58 from the third counter electrode 59. With such a configuration, the first counter electrode 57, the second counter electrode 58, and the third counter electrode 59 are configured to be able to apply a voltage independently of one another.

In the electrophoretic display device 103 with the configuration mentioned above, a method for gray-scale display will be described below with reference to FIGS. 15A through 15D. As described in the first embodiment, a description is given of a case of display using the positively charged black particles 26 and the negatively charged white particles 27. It is to be noted that the directions of movements and the arrangements of the black particles 26 and the white particles 27 are opposite each other. Therefore, here, attention is paid only to the black particles 26, and a description of the white particles 27 is omitted. Note also that FIGS. 15A through 15D illustrate four pixels 40, which are termed a "pixel PX1", a "pixel PX2", a "pixel PX3", and a "pixel PX4" in the order from the left. Three counter electrodes corresponding to one pixel 40 are termed the "first counter electrode 57", the "second counter electrode 58", and the "third counter electrode 59" in the order from the left. Note also that, in actuality, a large number of black particles 26 exist in the electrophoretic element 32. However, in order to simplify the description of a gray scale, here, it is assumed that one black particle 26 exists for an area corresponding to each counter electrodes 57, 58, or 59.

Figure 15A:
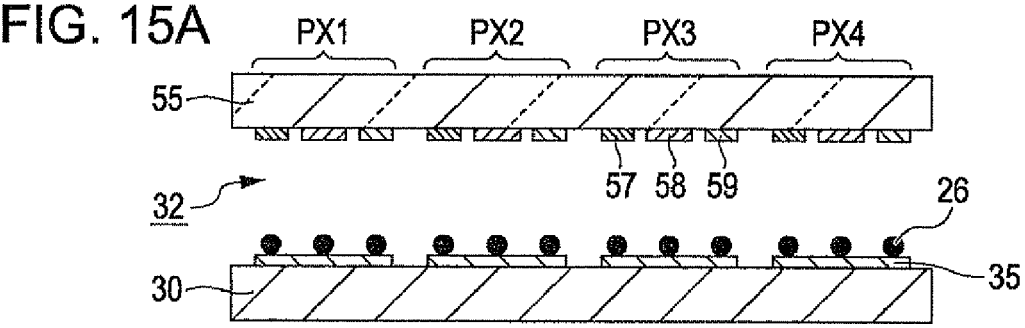
FIGS. 15A through 15D illustrate actions of the electrophoretic display device of the fourth embodiment.

In the initial state, as illustrated in FIG. 15A, black particles are pulled to all the pixel electrodes 35, and, as a result, all pixels are displayed in white. To bring about such a state, for example, it is only necessary that the potentials of all the pixel electrodes 35 are set to 0 V, and the potentials of all the counter electrodes 57, 58, and 59 are set to 15 V.

Figure 15B:
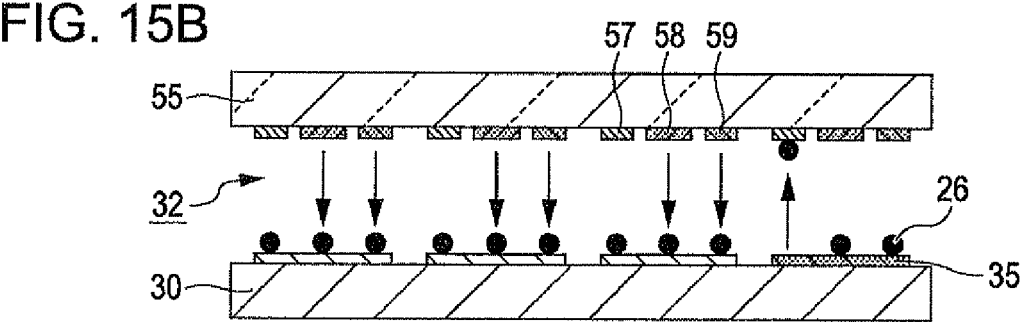

In a first step, as illustrated in FIG. 15B, the potentials of the pixel electrodes 35 of the pixel PX1, the pixel PX2, and the pixel PX3 are set to 0 V, the potential of the pixel electrode 35 of the pixel PX4 is set to +15 V, the potentials of the first counter electrodes 57 are set to 0 V, the potentials of the second counter electrodes 58 and the third counter electrodes 59 are set to +15 V. As such, only in an area corresponding to the first counter electrode 57 of the pixel PX4, the side of the counter electrode 57 is lower in potential than the side of the pixel electrode 35, and therefore Coulomb forces from the side of the pixel electrode 35 toward the side of the counter electrode 57 cause only the black particle 26 in this area to move to the side of the counter electrode 57. At this point, the numbers of the black particles 26 existing on the side of the counter electrodes 57, 58, and 59 (viewing side) are zero in the pixel PX1, zero in the pixel PX2, zero in the pixel PX3, and one in the pixel PX4. It is to be noted that, in FIGS. 15B to 15D, the arrows indicate directions of Coulomb forces from the high potential side toward the low potential side, and the shaded electrodes represent electrodes to which a voltage of +15 V is applied.

Figure 15C:
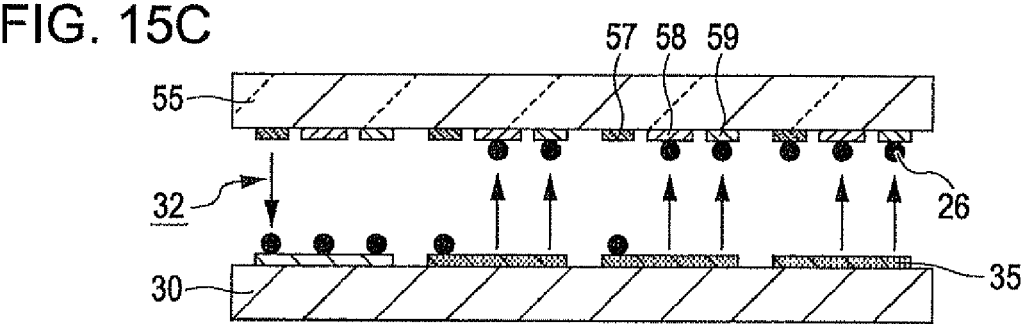

Next, in a second step, as illustrated in FIG. 15C, the potential of the pixel electrode 35 of the pixel PX1 is set to 0 V, the potentials of the pixel electrodes 35 of the pixel PX2, the pixel PX3, and the pixel PX4 are set to +15 V, the potentials of the first counter electrodes 57 are set to +15 V, the potentials of the second counter electrodes 58 and the third counter electrodes 59 are set to 0 V. As such, in an area corresponding to the first counter electrode 57 of the pixel PX1, the side of the pixel electrode 35 is lower in potential than the side of the counter electrode 57, and therefore Coulomb forces are generated from the side of the counter electrode 57 toward the side of the pixel electrodes 35. However, the black particle 26 in this area exists on the side of the pixel electrodes 35 from the beginning, and therefore the black particle 26 does not move. In an area corresponding to the second counter electrode 58 of the pixel PX2, an area corresponding to the third counter electrode 59 of the pixel PX2, an area corresponding to the second counter electrode 58 of the pixel PX3, an area corresponding to the third counter electrode 59 of the pixel PX3, an area corresponding to the second counter electrode 58 of the pixel PX4, and an area corresponding to the third counter electrode 59 of the pixel PX4, the side of the counter electrodes 58 and 59 is lower in potential than the side of the pixel electrodes 35, and therefore Coulomb forces from the side of the pixel electrodes 35 toward the side of the counter electrodes 58 and 59 cause the black particles 26 in these areas to move to the side of the counter electrodes 58 and 59. It is to be noted that Coulomb forces are not exerted on the black particle 26 in the area corresponding to the first counter electrode 57 of the pixel PX4 that has moved in the first step. This black particle 26 remains on the side of the counter electrode 57. At this point, the numbers of the black particles 26 existing on the side of the counter electrodes 57, 58, and 59 (viewing side) are zero in the pixel PX1, two in the pixel PX2, two in the pixel PX3, and three in the pixel PX4.

Figure 15D:
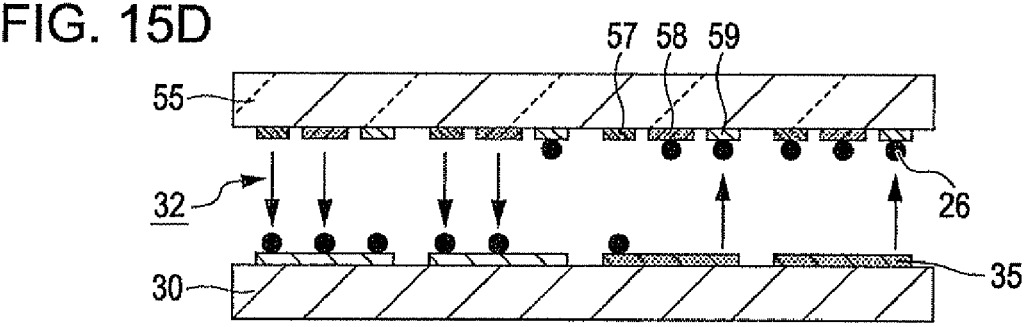

Next, in a third step, as illustrated in FIG. 15D, the potentials of the pixel electrodes 35 of the pixel PX1 and the pixel PX2 are set to 0 V, the potentials of the pixel electrodes 35 of the pixel PX3 and the pixel PX4 are set to +15 V, the potentials of the first counter electrodes 57 and the second counter electrodes 58 are set to +15 V, and the potentials of the third counter electrodes 59 are set to 0 V. As such, in areas corresponding to the first counter electrode 57 and the second counter electrode 58 of the pixel PX1, and an area corresponding to the first counter electrode 57 of the pixel PX2, the side of the pixel electrodes 35 is lower in potential than the side of the counter electrodes 57 and 58, and therefore Coulomb forces are generated from the side of the counter electrodes 57 and 58 toward the side of the pixel electrodes 35. However, the black particles 26 in these areas exist on the side of the pixel electrodes 35 from the beginning, and therefore do not move. In an area corresponding to the second counter electrode 58 of the pixel PX2, the side of pixel electrode 35 is lower in potential than the side of the counter electrode 58, and therefore Coulomb forces from the side of the counter electrode 58 toward the side of the pixel electrode 35 cause the black particle 26 in this area to move to the side of the pixel electrode 35. The black particles 26 of other areas remain at the current positions. At this point, the numbers of the black particles 26 existing on the side of the counter electrodes 57, 58, and 59 (viewing side) are zero in the pixel PX1, one in the pixel PX2, two in the pixel PX3, and three in the pixel PX4.

In this way, from the initial state where all the pixels PX1 to PX4 are displayed in white, the voltage application in the above first to third steps enables gray-scale display varying from white display to black display gradually from the side of the pixel PX1 toward the side of the pixel PX4.

With the electrophoretic display device 103 of this embodiment, the combination of voltages to be applied to the pixel electrodes 35 of the pixels PX1 to PX4 and the first to third counter electrodes 57, 58, and 59 corresponding thereto are changed, which makes it possible to control the movements of electrophoretic particles in each of areas, where the counter electrodes 57, 58, and 59 are formed, in one pixel. Therefore, without a plurality of subpixels included in a pixel, an electrophoretic display device that enables gray-scale display can be implemented with a simple configuration.

Fifth Embodiment

Figure 16:
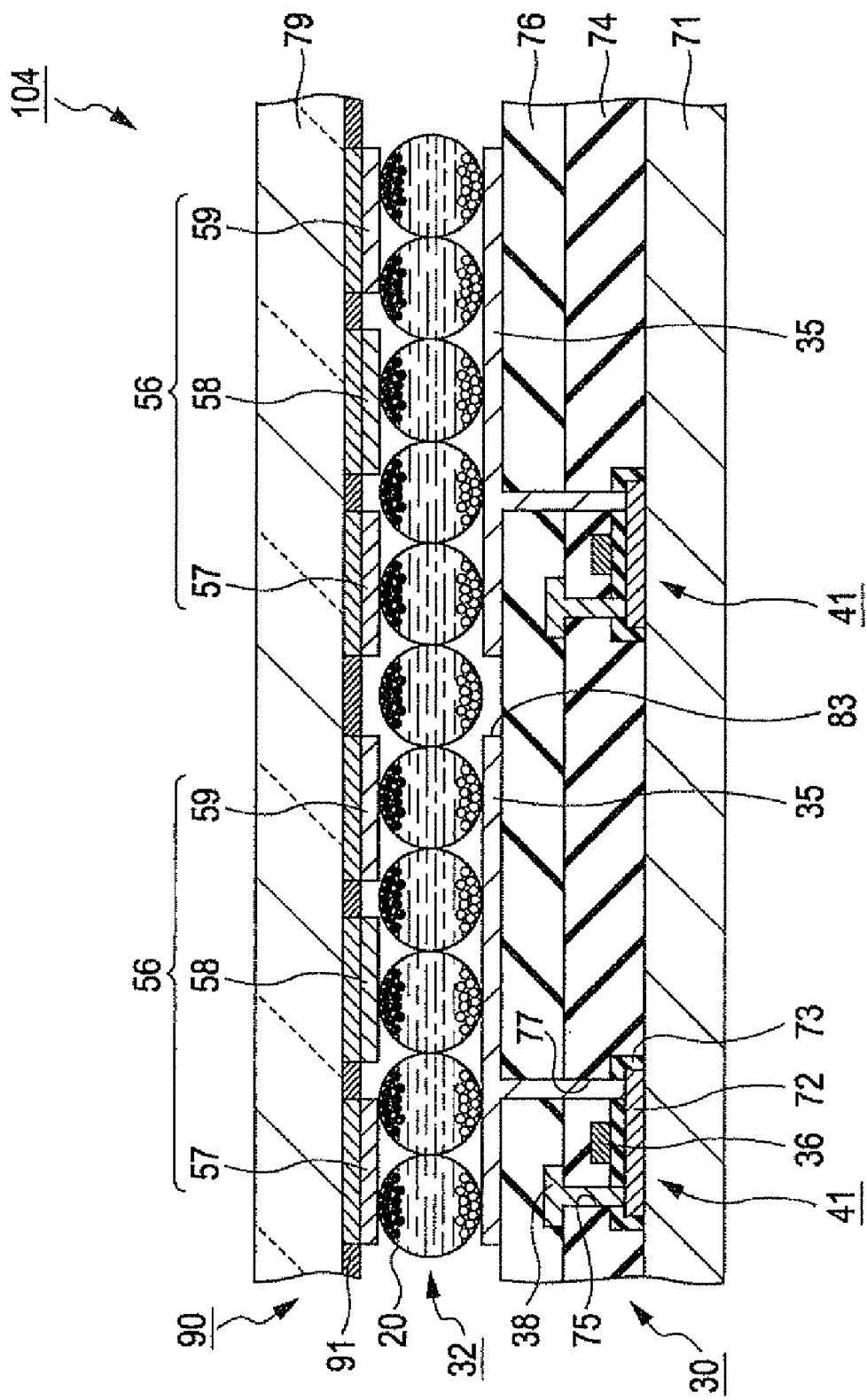
FIG. 16 is a sectional view illustrating an electrophoretic display device of a fifth embodiment of the invention.

With reference to FIG. 16, a fifth embodiment of the invention will be described below. The basic configuration of an electrophoretic display device of this embodiment is similar to that of the fourth embodiment. However, the electrophoretic display device of this embodiment includes a color filter in a counter substrate. In this respect, the electrophoretic display device of this embodiment differs from that of the fourth embodiment. FIG. 16 is a sectional view of the electrophoretic display device of this embodiment. In FIG. 16, components in common with FIG. 2 of the first embodiment are denoted by the same reference characters, and the detailed description thereof is omitted.

In an electrophoretic display device 104 of this embodiment, as illustrated in FIG. 16, a color filter 91 is provided on a surface on the side of the electrophoretic element 32 of the substrate body 79 of a counter substrate 90. The color filter 91 includes color material layers of colors that are different from one another among the first counter electrode 57, the second counter electrode 58, and the third counter electrode 59. For example, the color filter 91 includes color material layers of read (R), green (G), and blue (B). The first counter electrode 57, the second counter electrode 58, and the third counter electrode 59, which are similar to those in the fourth embodiment, are Provided on each color material layer of the color filter 91. Other configurations are similar to those in the fourth embodiment.

The method for gray-scale display has been described in the fourth embodiment. In the electrophoretic display device 104 of this embodiment, the color filter 91 is included. As a result of this inclusion, the combination of voltages to be applied to the pixel electrodes 35 of the pixels 40 and the first to third counter electrodes 57, 58, and 59 corresponding thereto are changed, which makes possible to control the movements of electrophoretic particles in each of areas, where the counter electrodes 57, 58, and 59 are formed, in one pixel. Thus, color display is enabled. Accordingly, without a plurality of subpixels included in one pixel, an electrophoretic display device that enables color display can be implemented with a simple configuration.

It is to be noted that the technical scope of the invention is not limited to the foregoing embodiments, and various changes can be added without departing from the spirit of the invention. In the foregoing embodiments, the configuration has been described that provides opening portions of a counter electrode in all areas between pixel electrodes that are adjacent to each other. Instead of this configuration, a configuration that does not provide an opening portion of the counter electrode in part of the all areas between the adjacent pixel electrodes, for example, a configuration in which areas with opening portions and areas without opening portions are alternately arranged may be used. In this case, bleeding of pixels occurs in the areas between pixel electrodes where opening portions are not provided. However, if the bleeding is within the acceptable range when the entire image is viewed, such a configuration may be employed. In addition, specific configurations such as materials, shapes, and amounts of components of an electrophoretic display device are not limited to those of the foregoing embodiments, and can be changed as appropriate.

In the foregoing embodiments, examples of active-matrix electrophoretic display devices have been mentioned. However, the invention is applicable to simple matrix (passive-matrix) electrophoretic display devices.

Electronic Apparatuses

Figure 17A:
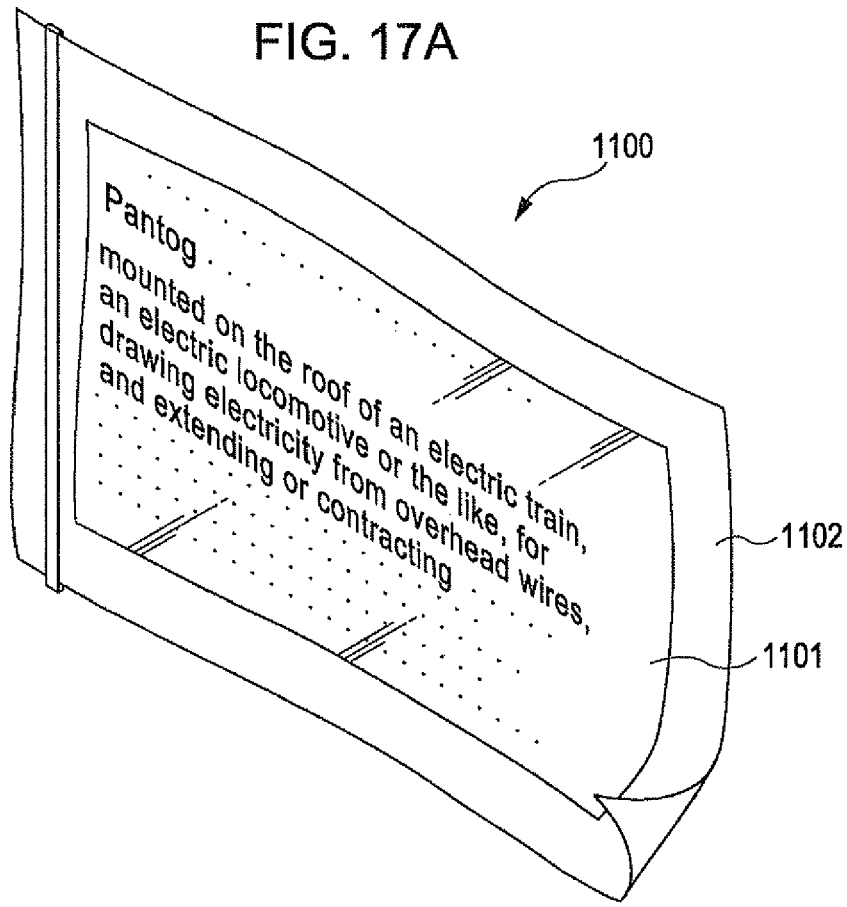
FIGS. 17A and 17B illustrate electronic apparatuses according to embodiments of the invention.

Next, cases where the electrophoretic display devices 100 to 104 of the foregoing embodiments are applied to electronic apparatuses will be described. FIG. 17A is a perspective view illustrating a configuration of an electronic paper 1100. The electronic paper 1100 includes the electrophoretic display device of the embodiment in a display region 1101. The electronic paper 1100 has flexibility and includes a body 1102 made of a rewritable sheet having texture and bendability similar to those of existing paper.

Figure 17B:
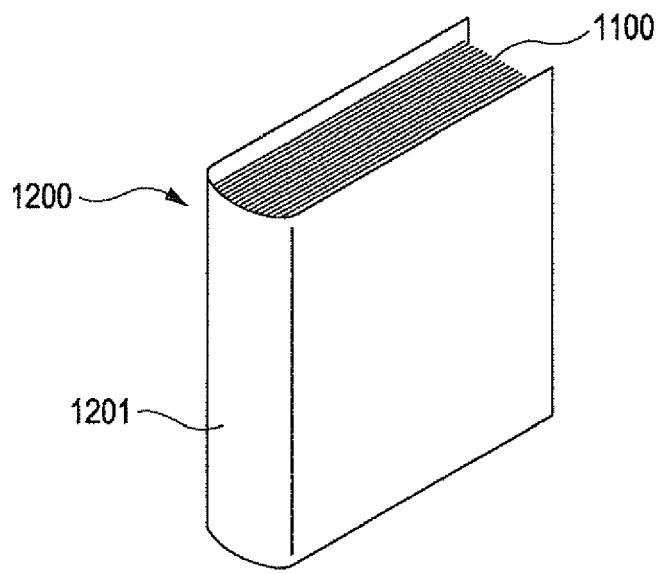

FIG. 17B is a perspective view illustrating a configuration of an electronic notebook 1200. The electronic notebook 1200 includes a plurality of pieces of the electronic paper 1100 mentioned above in a bundle and a cover 1201 sandwiching the electronic paper 1100 therein. The cover 1201 includes a display data inputting unit, which is not illustrated, for inputting display data transmitted from, for example, an external device. This unit allows the electronic notebook 1200 to change and update the content being displayed in accordance with the display data with the electronic paper 1100 remaining in the bundle.

The electronic paper 1100 and the electronic notebook 1200 mentioned above employ the electrophoretic display device according to an embodiment of the invention. Therefore, with the electronic paper 1100 and the electronic notebook 1200, it is possible to implement an electronic apparatus that includes a display section having less bleeding and being excellent in display quality. It is to be noted that the above-mentioned electronic apparatuses are illustrative of electronic apparatuses according to embodiments of the invention, and are not intended to limit the technical scope of the invention. For example, electrophoretic display devices according to embodiments of the invention can be preferably used for display sections of electronic apparatuses such as cellular telephones and portable audio units.

What is claimed is:

1. An electrophoretic display device including a first substrate, a second substrate, and an electrophoretic element disposed between the first substrate and the second substrate, comprising:
   a plurality of pixel electrodes provided on the first substrate and arranged in a row direction and in a column direction; and
   a counter electrode provided on the second substrate and configure to, in conjunction with the pixel electrodes, apply a voltage to the electrophoretic element, wherein
   the counter electrode including an opening portion extending in at least one of the row direction and the column direction at a location opposite an area between the pixel electrodes adjacent to each other, and
   the counter electrode includes a plurality of island-shaped portions provided at locations opposite respective ones of the plurality of pixel electrodes, a frame portion provided so as to surround a perimeter of the plurality of island-shaped portions, and coupling portions coupling the plurality of island-shaped portions to each other and coupling a predetermined one of the island-shaped portions and the frame portion.

2. An electrophoretic display device including a first substrate, a second substrate, and an electrophoretic element disposed between the first substrate and the second substrate, comprising:
   a plurality of pixel electrodes provided on the first substrate and arranged in a row direction and in a column direction; and
   a counter electrode provided on the second substrate and configure to in conjunction with the pixel electrodes, apply a voltage to the electrophoretic element, wherein
   the counter electrode including an opening portion extending in at least one of the row direction and the column direction at a location opposite an area between the pixel electrodes adjacent to each other,
   the counter electrode includes a first counter electrode having the opening portion, and a second counter electrode provided at least in an area corresponding to the opening portion and being capable of applying a voltage independently of the first counter electrode, and
   the second counter electrode is provided on the second substrate, and the first counter electrode is provided on the second counter electrode with an insulating layer interposed therebetween.

3. The electrophoretic display device according to claim 2, wherein the first counter electrode and the second counter electrode are formed in an identical layer.

4. The electrophoretic display device according to claim 1, further comprising a color filter provided with color material layers of colors that differ in accordance with the plurality of pixel electrodes.

5. An electrophoretic display device including a first substrate, a second substrate, and an electrophoretic element disposed between the first substrate and second substrate, comprising:
   a plurality of pixel electrodes provided on the first substrate and arranged in a row direction and in a column direction; and
   a counter electrode provided on the second substrate and configured to, in conjunction with the pixel electrodes, apply a voltage to the electrophoretic element,
   the counter electrode including a plurality of electrodes each at a location opposite one of the pixel electrodes, the plurality of electrodes being capable of individually applying a voltage.

6. The electrophoretic display device according to claim 5, further comprising a color filter provided with color material layers of colors that differ in accordance with the plurality of electrodes.

7. An electronic apparatus comprising the electrophoretic display device according to claim 1.

8. An electronic apparatus comprising the electrophoretic display device according to claim 2.

9. An electronic apparatus comprising the electrophoretic display device according to claim 3.

10. An electronic apparatus comprising the electrophoretic display device according to claim 4.

11. An electronic apparatus comprising the electrophoretic display device according to claim 5.

12. An electronic apparatus comprising the electrophoretic display device according to claim 6.

13. The electrophoretic display device according to claim 2, further comprising a color filter provided with color material layers of colors that differ in accordance with the plurality of pixel electrodes.

14. An electronic apparatus comprising the electrophoretic display device according to claim 13.

* * * * *